(No Model.)　　　　　　　　　　　　　　　　　　　2 Sheets—Sheet 1.

W. PELZ.
METHOD OF MAKING CAR WHEELS.

No. 322,635.　　　　　　　　　Patented July 21, 1885.

Witnesses　　　　　　　　　　　　　Inventor
Chas. H. Smith　　　　　　　　　　Wilhelm Pelz
J. Staib　　　　　　　　　　per Lemuel W. Serrell
　　　　　　　　　　　　　　　　　　atty N. PETERS, Photo-Lithographer, Washington, D. C.

(No Model.) 2 Sheets—Sheet 2.
W. PELZ.
METHOD OF MAKING CAR WHEELS.
No. 322,635. Patented July 21, 1885.

UNITED STATES PATENT OFFICE.

WILHELM PELZ, OF ESSEN, GERMANY, ASSIGNOR TO FRIED KRUPP, OF SAME PLACE.

METHOD OF MAKING CAR-WHEELS.

SPECIFICATION forming part of Letters Patent No. 322,635, dated July 21, 1885.

Application filed March 9, 1885. (No model.) Patented in England June 12, 1883, No. 2,914; in France December 24, 1883, No. 159,362; in Belgium December 31, 1883, No. 63,729; in Austria March 29, 1884, No. 1,398, and in Italy December 31, 1884, XXXV, 181.

*To all whom it may concern:*

Be it known that I, WILHELM PELZ, subject of the Emperor of Germany, residing at Essen, in the Empire of Germany, have invented certain new and useful Improvements in Railway-Wheels, also applicable to wheels for other purposes, of which the following is a specification.

This invention consists in manufacturing wheels of various constructions of iron or steel with steel or iron rims or tires welded onto the body of the wheel, while the outer edge of the body is at the same time forced into a corresponding recess or recesses in the rim or tire.

I proceed in the following manner: I make the body and the rim of the wheel separately, either by forging or rolling, or by both, in such a manner that the outer edge of the body of the wheel and the inner edge of the rim are respectively provided with a projecting part or parts and corresponding recessed part or parts which fit into one another. Both parts of the wheel are then heated to welding-heat and welded together in a die, either by hammering or by a press, with or without the employment of welding-flux, whereby at the same time the body of the wheel is expanded, so that the edge part of it is made to enter and fill the recessed part or parts of the rim.

Figure 2:
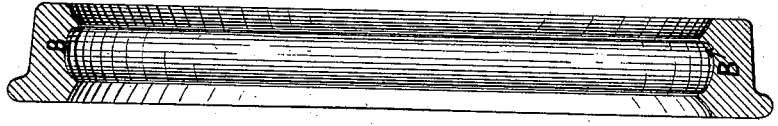
Figure 1:
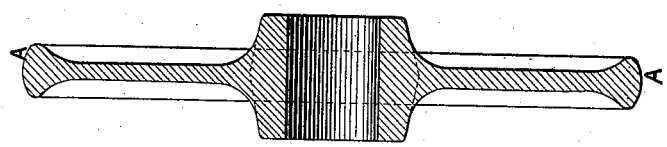
Figure 5:
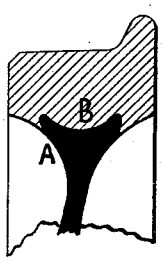
Figure 8:
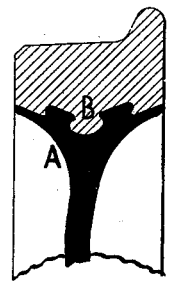
Figure 6:
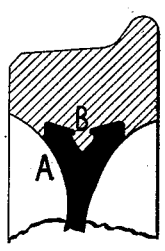
Figure 9:
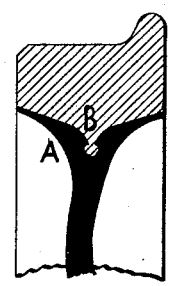
Figure 7:
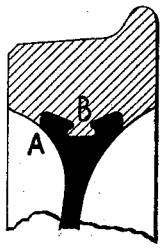
Figure 10:
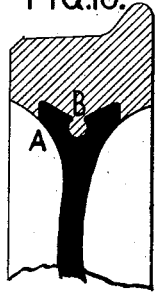

Figure 1 of the accompanying drawings is a section through the inner or disk part of a disk-wheel, and Fig. 2 is a section through the tire or rim part of same.

Figure 4:
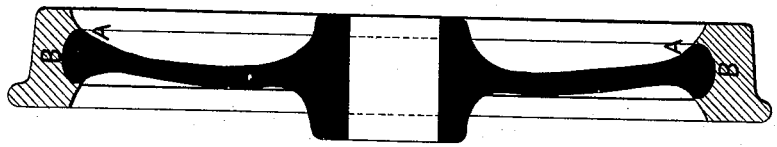
Figure 3:
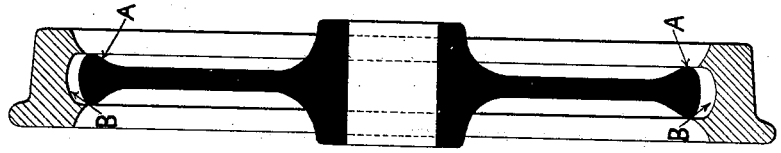

In making a disk-wheel, the disk with the nave, Fig. 1, is made of iron, in a die or rollers or any suitable manner, and the rim or tire, Fig. 2, of steel. Both are formed with the corresponding projection, A, Fig. 1, and recess B, Fig. 2. Then both the parts of the wheel are exposed to welding-heat. The two parts of the wheel are then laid in the die in the position shown in Fig. 3, and the pressure necessary for a good weld is applied by means of a steam-hammer or a hydraulic press, when it assumes the form shown in the sectional view, Fig. 4. The disk and nave part of the wheel are by preference made according to the specification of the United States Patent granted to me the 5th day of September, 1876, No. 181,853.

Figs. 5, 6, 7, 8, 9, and 10 show different sectional shapes that may be given to the rim of the wheel and tire when welded together. It is, however, evident that other and similar modifications may be made for effecting the same purpose without departing from this invention. It will be observed that in these sections the union of the tire and wheel is rendered very secure by the sections when united, forming a clip as well as a weld, the metal of the wheel being driven into the section of the tire in (or by) the process of welding; pressure by hammering or otherwise being applied to the web part of the wheel, so as to expand it, thus causing the outer shaped edge of the web part to enter, embrace, and fill the corresponding parts of the tire. In case the tire should break, it will nevertheless be held onto the body of the wheel irrespective of the weld.

And having thus described and ascertained the nature of this invention, and the manner of carrying the same into effect, I declare that I am aware that it has been heretofore proposed to make railway-wheels with the tire of one entire piece of metal and the spokes welded to the same; also, that it has been proposed to cast the body or center of one kind of metal—such as ordinary cast-iron—and the tire of another kind of metal—such as hard cast-iron or steel—both cast in a mold at or about the same time; also, that it has been proposed to weld a wrought-steel tire to a cast-iron body by heating the tire, running a flux onto its interior surface, and then casting the spokes and nave in, the flux thus serving to weld the tire to the spokes; also, that it has been proposed to shrink on a steel tire to a disk or wheel-center; also, that it has been proposed to make the spokes or center of the wheel of wrought steel or iron, or of rolled or forged steel or iron, and to cast a steel tire round same.

I am also aware that it has been proposed to make the body of a wheel wholly or mainly of cast-iron having a steel tire welded to the head, the union being made in a mold in which the wheel is cast; but

I claim—

1. The method herein specified of manufacturing car-wheels, consisting in forming the malleable rim with a recessed or interlocking inner surface, and the malleable middle disk part or spokes with outward projections, and then bringing the two parts to welding-heat and placing them in suitable dies, and then by blows or pressure expanding the middle disk part or spokes, so that the same is made to interlock with the inner surface of the rim, substantially as set forth.

2. The method herein specified of manufacturing car-wheels, consisting in forming the rim with a recessed inner surface and the spokes or disk separately out of malleable metal, and then spreading the metal of the disk or arms into the recessed inner surface of the rim and welding the parts together, substantially as specified.

WILHELM PELZ.

Witnesses:
HEINRICH LIPPERT,
HERMANN KUHFUS.